United States Patent
Ye et al.

(10) Patent No.: US 12,482,150 B2
(45) Date of Patent: Nov. 25, 2025

(54) MAGNETIC RESOURCE IMAGING RECOVERY METHOD USING SCORE-BASED DIFFUSION MODEL AND APPARATUS THEREOF

(71) Applicant: Korea Advanced Institute of Science and Technology, Daejeon (KR)

(72) Inventors: Jongchul Ye, Daejeon (KR); Hyungjin Chung, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 330 days.

(21) Appl. No.: 18/054,794

(22) Filed: Nov. 11, 2022

(65) Prior Publication Data

US 2023/0154069 A1 May 18, 2023

(30) Foreign Application Priority Data

Nov. 12, 2021 (KR) .......................... 10-2021-0155585

(51) Int. Cl.
*G06T 11/00* (2006.01)
*G06T 5/70* (2024.01)

(52) U.S. Cl.
CPC .............. *G06T 11/006* (2013.01); *G06T 5/70* (2024.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | |
|---|---|---|
| 2019/0369190 A1 | 12/2019 | Ye |
| 2020/0096586 A1* | 3/2020 | Hammes ................. G16H 30/20 |
| 2020/0118307 A1* | 4/2020 | Boada .................... G06T 11/006 |
| 2023/0067841 A1* | 3/2023 | Saharia ................. G06T 3/4007 |

FOREIGN PATENT DOCUMENTS

| | | | | |
|---|---|---|---|---|
| CN | 109583500 A | * | 4/2019 | ........... G06K 9/6256 |
| KR | 10-2215702 | | 2/2021 | |
| KR | 102285348 B1 | | 8/2021 | |

OTHER PUBLICATIONS

C. Quan et al., "Homotopic Gradients of Generative Density Priors for MR Image Reconstruction," in IEEE Transactions on Medical Imaging, vol. 40, No. 12, pp. 3265-3278, Dec. 2021, doi: 10.1109/TMI.2021.3081677.*
"Score-based Generative Modeling by Diffusion Process", SI Analytics, Feb. 15, 2021.

(Continued)

*Primary Examiner* — Jiangeng Sun
(74) *Attorney, Agent, or Firm* — NIXON PEABODY LLP (57) ABSTRACT

A magnetic resonance imaging (MRI) recovery method using a score-based diffusion model and an apparatus thereof are provided. The MRI recovery method using the score-based diffusion model, which is performed by a computer, is implemented, including training a continuous time-dependent score function with denoising score matching and sampling data from a conditional distribution given the measurements, leveraging the learned score function, and recovering an image.

11 Claims, 5 Drawing Sheets

(56) References Cited

OTHER PUBLICATIONS

Samsonov et al. "Pocsense: POCS-based reconstruction for sensitivity encoded magnetic resonance imaging.", Magnetic Resonance in Medicine, Jul. 29, 2004, 52, Wiley InterScience.
Zbontar, et al., "fastMRI: An Open Dataset and Benchmarks for Accelerated MRI"; arXiv: 1811.08839v2 [cs.CV], Dec. 11, 2019, 35 pps.
Song, et al., "Score-Based Generative Modeling Through Stochastic Differential Equations;" published as conference paper at ICLR 2021; Feb. 10, 2021 https://arxiv.org/pdf/2011.13456.pdf; 36 pps.

* cited by examiner

MAGNETIC RESOURCE IMAGING RECOVERY METHOD USING SCORE-BASED DIFFUSION MODEL AND APPARATUS THEREOF

CROSS-REFERENCE TO RELATED APPLICATIONS

A claim for priority under 35 U.S.C. § 119 is made to Korean Patent Application No. 10-2021-0155585 filed on Nov. 12, 2021, in the Korean Intellectual Property Office, the entire contents of which are hereby incorporated by reference.

BACKGROUND

Embodiments of the present disclosure described herein relate to a magnetic resonance imaging (MRI) recovery method using a score-based diffusion model and an apparatus thereof, and more particularly, relate to an MRI recovery method using a score-based diffusion model to recover an image at high accuracy using the diffusion model and an apparatus thereof.

Reconstruction (recovery) methods from sub-sampled measurements for magnetic resonance imaging (MRI) have seen a lot of progress over the years. Iterative methods exploit the sparsity of hand-crafted priors along with data consistency to arrive at a solution. However, the construction of priors is often non-trivial, and none of them may not properly model the actual complicated data distribution of p(x). Data-driven deep learning methods train the models either directly or indirectly, yet the methods rely heavily on the supervision of a well-curated large database of k-space data, which is hard to obtain.

Recently, score-based models and denoising diffusion probabilistic models have gained wide interest as a new class of generative model that achieves surprisingly high sample quality without adversarial training. Among many works, generalized discrete score-matching procedures to a continuous stochastic differential equation (SDE), which in fact also subsumes diffusion models into the same framework. Embodiments of the present disclosure refer to score-based SDEs as score-based diffusion models henceforth to emphasize that the proposed methodology may be flexibly used with any realizations from the two model classes.

Score-based diffusion models perturb the data distribution according to the forward SDE by injecting Gaussian noise, arriving at a tractable distribution (e.g. isotropic Gaussian distribution). In order to sample from the data distribution, embodiments of the present disclosure may train a neural network to estimate the gradient of the log data distribution (i.e. score function, $\nabla x \log p(x)$), and use it to solve the reverse SDE numerically. Unconditional generation of samples from p(x) using these score-based diffusion models have found corresponding applications in image, audio, and even graph synthesis. Conditional generation from p(x|y) has also been studied in the context of widely known computer vision problems: image recovery, super-resolution, and image editing.

Korean Patent Registration No. 10-2215702 relates to an MRI processing method using a neural network and an apparatus thereof, which describes a technology of image processing capable of restoring an MRI image to a high-quality image using a neural network for interpolating a Fourier space.

PRIOR ART DOCUMENTS

Patent Documents

Korean Patent Registration No. 10-2215702

Non-Patent Documents (Non-patent document 1) Song, Y., Sohl-Dickstein, J., Kingma, D. P., Kumar, A., Ermon, S., Poole, B., 2021c. Score-based generative modeling through stochastic differential equations, in: 9th International Conference on Learning Representations, ICLR.

(Non-patent document 2) Zbontar, J., Knoll, F., Sriram, A., Murrell, T., Huang, Z., Muckley, M. J., Defazio, A., Stern, R., Johnson, P., Bruno, M., et al., 2018. fastMRI: An open dataset and benchmarks for accelerated MRI. arXiv preprint arXiv: 1811.08839.

SUMMARY

Embodiments of the present disclosure provide an MRI recovery method using a score-based diffusion model and an apparatus thereof, and, specifically, provide a technology capable of recovering an image with high accuracy using the diffusion model.

Embodiments of the present disclosure provide an MRI recovery method using a score-based diffusion model to sample data from a conditional distribution given the measurements, leveraging the trained score function, to solve inverse problems in imaging and an apparatus thereof.

According to an embodiment, a magnetic resonance imaging (MRI) recovery method using a score-based diffusion model, which is performed by a computer device, may include training a continuous time-dependent score function with denoising score matching and sampling data from a conditional distribution given measurements, leveraging the trained score function, and recovering an image.

The training of the score function may include training the score function of training the distribution of MRI with continuous-time score matching using the score-based diffusion model.

The training of the score function may include training a network using denoising score matching loss for a variance preserving-stochastic differential equation (VP-SDE).

The training of the score function may include training a network using denoising score matching loss for a variance exploding-SDE (VE-SDE).

The recovering of the image may include solving an SDE using the trained score function and assigning data consistency by replacing the measurements with known values. The solving of the SDE and the assigning of the data consistency may be iteratively performed.

The solving of the SDE may include splitting the image into a real part and an imaginary part and iteratively applying a predictor step and a corrector step to each of the real part and the imaginary part.

The recovering of the image may include reconstructing complex-valued data using the score function trained with DICOM images only.

The recovering of the image may include recovering, reconstructing, and merging respective coil images using parallel imaging.

According to an embodiment, a magnetic resonance imaging (MRI) recovery apparatus using a score-based diffusion model may include a training unit that trains a continuous time-dependent score function with denoising score matching and an image recovery unit that samples data from conditional distribution given measurements, leveraging the trained score function, and recovers an image.

The training unit may train a network using denoising score matching loss for a variance preserving-stochastic differential equation (VP-SDE).

The training unit may train a network using denoising score matching loss for a variance exploding-SDE (VE-SDE).

The image recovery unit may include an update unit that solves an SDE using the trained score function and a data consistency unit that assigns data consistency by replacing the measurements with known values. The solving of the SDE in the update unit and the assigning of the data consistency in the data consistency unit may be iteratively performed.

The update unit may split the image into a real part and an imaginary part and iteratively may apply a predictor step and a corrector step to each of the real part and the imaginary part.

The image recovery unit may reconstruct complex-valued data using the score function trained with DICOM images only.

The image recovery unit may recover, reconstruct, and merge respective coil images using parallel imaging.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Hereinafter, embodiments of the present disclosure will be described with reference to the accompanying drawings. However, embodiments to be described may be modified in the different forms, and the scope and spirit of the inventive concept is not limited by the embodiments to be described below. In addition, various embodiments are provided to describe this disclosure more fully to those skilled in the art. For a clear description, forms, sizes, and the like of elements may be exaggerated in a drawing.

Score-based diffusion models provide a method to model images using the gradient of the data distribution. Here, embodiments of the present disclosure propose a method to sample data from a conditional distribution given the measurements, leveraging the trained score function. Thus, the score-based diffusion models may be readily used for solving inverse problems in imaging, especially for accelerated MRI. In other words, embodiments of the present disclosure train a continuous time-dependent score function with denoising score matching. Then, at the inference stage, embodiments of the present disclosure iterate between the numerical SDE solver and data consistency step to achieve reconstruction. The score-based diffusion model requires DICOM images only for training, and yet is able to recover complex-valued data, and even extends to parallel imaging. The proposed method is agnostic to sub-sampling patterns and may be used with any sampling schemes. Also, due to its generative nature, an approach according to embodiments may quantify uncertainty, which is not possible with standard regression settings. On top of all the advantages, a method according to embodiments also has very strong performance, even beating the models trained with full supervision. With extensive experiments, the superiority of the method according to embodiments is verified in terms of quality and practicality.

An embodiment of the present disclosure proposes a framework generally applicable to solving inverse problems in imaging and especially focuses on the task of MRI reconstruction. Because an algorithm relies on projection onto convex set (POCS), which has already been extensively studied in the field of MRI reconstruction, the method score will be referred to as POCS. Particularly, the score-POCS should learn a single score function only with DICOM images, as in previous task aimed at generating images. Despite the fact that the score function was not trained to solve the image reconstruction task, the method according to embodiments achieves state-of-the-art performance, even outperforming models that were trained in a supervised fashion specifically for image reconstruction tasks for complex images. Furthermore, the model according to embodiments is agnostic to the sub-sampling pattern used in the acceleration procedure, as opposed to supervised models which require re-training every time a new sampling scheme is designed. Finally, the proposed method may be extended to the reconstruction of complex-valued single coil and multi-coil acquisition using a single network that has never seen complex-valued data before.

Embodiments of the present disclosure train a network using the denoising score matching loss for variance exploding-SDE (VE-SDE). Embodiments of the present disclosure construct a solver for the reverse SDE, which is capable of extracting a sample in the distribution $p(x|y)$, conditioned on the measurement y using the trained model. This is done by imposing projection-based data consistency step at every iteration, after the unconditional update step. Here, it was found empirically that complex-valued images may be reconstructed simply by separately applying the score function to the real part and the imaginary part of the image. Even more, the method according to embodiments may be readily applied to practical multi-coil settings with the same score function, using a GRAPPA-type approach capable of applying the update via score function in parallel to each coil image. Overview of the proposed method is illustrated in FIG. 1, and the proposed method will be described in detail below.

Figure 1:
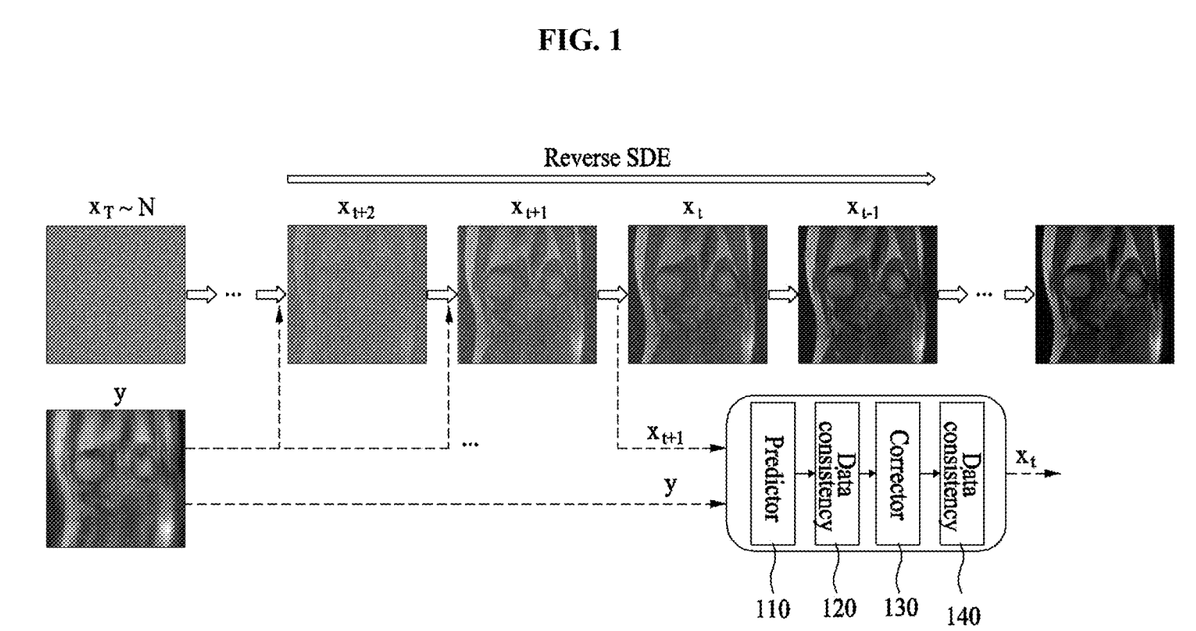
FIG. 1 is a drawing schematically illustrating an MRI recovery method using a score-based diffusion model according to an embodiment of the present disclosure.

FIG. 1 is a drawing schematically illustrating an MRI recovery method using a score-based diffusion model according to an embodiment of the present disclosure.

Referring to FIG. 1, the MRI recovery method using the score-based diffusion model according to an embodiment of the present disclosure may be to start from xT, sampled from the prior distribution, solve reverse SDE with score-POCS sampling, and alternate between update steps 110 and 130 and data consistency steps 120 and 140 to reach $x_0$.

The proposed MRI recovery method using the score-based diffusion model is inherently stochastic, and for that, may sample multiple reconstruction results from the same measurement vector y. This is especially useful since embodiments of the present disclosure are able to quantify uncertainty without any specific treatment (e.g., Monte Carlo dropout, estimating variance directly to the neural net). Here, at low acceleration factors, posterior samples do not deviate much from each other, meaning high confidence of the network. As the acceleration factor is pushed to higher values, the variance gradually increases, which may potentially aid practitioners' decision-making.

Hereinafter, a relevant background on score-based diffusion models is described, score-POCS that is a detailed procedure and algorithm of the proposed method is presented, and specifications about the implementation and experiments are given.

Score-Based SDE

Embodiments of the present disclosure may construct a continuous diffusion process $\{x(t)\}_{t=0}^T$ with $x(t) \in \mathbb{R}^n$, where $t \in [0, T]$ is the time index of the progression and n denotes the image dimension. At this time, embodiments of the present disclosure may select $x(0) \sim p_{data}$ and $x(T) \sim p_T$, where $p_{data}$, $p_T$ refer to the data distribution of interest and the prior distribution, which are tractable to sample from (e.g. spherical Gaussian distribution), respectively. Then, the stochastic process may be constructed as the solution to the following SDE.

$$dx = f(x,t)dt + g(t)dw,\qquad \text{[Equation 1]}$$

Here, $f \in \mathbb{R}^n$ and $g \in \mathbb{R}$ correspond to the drift coefficient, and the diffusion coefficient, respectively, and $w \in \mathbb{R}^n$ deviates a Brownian motion.

Embodiments of the present disclosure may construct different SDEs by choosing different functions for $f$ and $g$. First, the choice may be represented as follows.

$$f = -\frac{1}{2}\beta(t)x,\ g = \sqrt{\beta(t)} \qquad \text{[Equation 2]}$$

Here, $0 < \beta(t) < 1$ is a monotonically increasing function of noise scale. Embodiments of the present disclosure may achieve the variance preserving (VP)-SDE. In this case, the magnitude of the signal decays to 0, and the variance is preserved to a fixed constant as $t \to \infty$. In fact, VP-SDE may be seen as the continuous version of DDPM. Therefore, while DDPM was developed in a separate variational framework, it may also be seen as a realization of SDE.

On the other hand, variance exploding SDEs (VE-SDEs) choose the following.

$$f = 0,\ g = \sqrt{\frac{d[\sigma^2 - (t)]}{dt}}dw \qquad \text{[Equation 3]}$$

Here, $\sigma(t) > 0$ is again a monotonically increasing function, typically chosen to be a geometric series. Unlike VP-SDE, VE-SDE diffuses the signal with a very large variance, which explodes as $t \to \infty$, hence its name. Empirically, embodiments of the present disclosure found that using VE-SDE typically leads to higher sample qualities, and hence focus on developing the method according to embodiments on top of VE-SDE hereafter. However, the use of VP-SDE (including the family of DDPMs developed under the variational framework) is also straightforward under a framework according to embodiments.

Interestingly, the reverse process of Equation 1 above may be constructed with another stochastic process, which may be represented as follows.

$$\begin{aligned}dx &= [f(x,t) - g(t)^2 \nabla_x \log p_t(x)]dt + g(t)d\bar{w} \\ &= \frac{d[\sigma^2 - (t)]}{dt}\nabla_x \log p_t(x) + \sqrt{\frac{d[\sigma^2 - (t)]}{dt}}d\bar{w},\end{aligned}\qquad \text{[Equation 4]}$$

$\nabla_x \log p_t(x)$ = score function

Here, dt is the infinitesimal negative time step, and $\bar{w}$ is the Brownian motion running backwards. The last equality follows by plugging in Equation 3 above to Equation 4 above.

In order to solve Equation 4 above, embodiments of the present disclosure have to know the score function for all t. Embodiments of the present disclosure may estimate this score function with a time-conditional neural network $s_\theta(x, t) \cong \nabla_x \log p_t(x(t))$, and may replace the term in Equation 4 above. Since embodiments of the present disclosure do not know the true score, they may instead use denoising score matching, where they replace the unknown $\nabla_x \log p_t(x)$ with $\nabla_x \log p_{0t}(x(t)|x(0))$, where $p_{0t}(x(t)|x(0))$ is the Gaussian perturbation kernel around $x(0)$. Under some regularity conditions, $s_\theta$ trained with denoising score matching will satisfy $s_\theta^*(x, t) = \log p_t(x(t))$ almost surely. Formally, embodiments of the present disclosure may optimize the parameters $\theta$ of the score network with the following cost:

$$\min_\theta \mathbb{E}_{t \sim U(0,1)}\big[ \qquad \text{[Equation 5]}$$
$$\lambda(t)\mathbb{E}_{x(0)}\mathbb{E}_{x(t)|x(0)}\big[\|s_\theta(x(t), t) - \nabla_x \log p_{\theta t}(x(t) | x(0))\|_2^2\big]\big]$$

In the case of Gaussian perturbation kernels, the gradient of the perturbation kernel may be formulated explicitly: $\nabla_x \log p_{0t}(x(t)|x(0)) = (x(t) - x(0))/\sigma(t)^2$. Intuitively, embodiments of the present disclosure may also understand Equation 5 above as training the neural network to denoise $x(t)$, which was constructed by adding noise to $x(0)$.

Once the network is trained with Equation 5 above, embodiments of the present disclosure may plug the approximation $s_\theta(x, t) \cong \nabla_x \log p_t(x(t))$ to solve the reverse SDE in Equation 4 above.

$$dx = \frac{d[\sigma^2(t)]}{dt}s_\theta(x, t) + \sqrt{\frac{d[\sigma^2(t)]}{dt}}d\bar{w} \qquad \text{[Equation 6]}$$

Then, embodiments of the present disclosure may solve the SDE numerically, for example, with Euler discretization. This involves discretizing t in range [0, 1] uniformly into N intervals such that $\Delta t = =$, $0 = t_0 < t_1 < \ldots < t_N = 1$. Additionally, embodiments of the present disclosure may correct the direction of gradient ascent with corrector algorithms such as Langevin MC. Iteratively applying a predictor step and a corrector step yields the predictor-corrector (PC) sampling algorithm presented in Algorithm 1, as presented in Table 1 below.

TABLE 1

Algorithm 1 Predictor-Corrector (PC) sampling

Require: $s_\theta$, N, M, $\{\epsilon_i\}$  Step six, $\{\sigma_i\}$  noise schedule
1: $x_N \sim N(0, \sigma_T^2 I)$
2: for i = N − 1: 0do
3:     $x_i' \leftarrow x_{i+1} + (\sigma_{i+1}^2 - \sigma_i^2) s_\theta(x_{i+1}, \sigma_{i+1})$
4:     $z \sim N(0, I)$
5:     $x_i \leftarrow x_i' + \sqrt{\sigma_{i+1}^2 - \sigma_i^2} z$
6:     for j = 1: M do
7:        $z \sim N(0, I)$
8:        $x_i' \leftarrow x_i + \epsilon_i s_\theta(x_i, \sigma_i)$
9:        $x_i \leftarrow x_i' + \sqrt{2\epsilon_i} z$
10:    end for
11: end for
12: return $x_0$
Line 3-5: Predictor, Line 7-9: Corrector With the algorithm presented in Algorithm 1, embodiments of the present disclosure may sample from the distribution p(x). Embodiments of the present disclosure may extend this sampling scheme to a conditional sampling algorithm, which may sample from p(x|y).

Forward Measurement Model

In accelerated MRI, embodiments of the present disclosure consider the following measurement model.

$$y = Ax \quad \text{[Equation 7]}$$

Here, $y \in \mathbb{R}^m$ is the measurement, $x \in \mathbb{R}^n$ is the latent image, and a parameterized forward measurement matrix $A \in \mathbb{R}^{m \times n}$ is defined as follows.

$$A_\Omega := \mathcal{P}_\Omega \mathcal{F} S \quad \text{[Equation 8]}$$

Here, $S := [S^{(1)}, \ldots; S^{(c)}]$ is the sensitivity map for c different coils, $\mathcal{F}$ denotes Fourier transform, and $\mathcal{P}_\Omega$ is the sub-sampling operator with the given sampling pattern $\Omega$. In the case of single-coil acquisition, S reduces to identity matrix such that $A_\Omega = \mathcal{P}_\Omega \mathcal{F} S$.

Reverse SDE for Accelerated MR Reconstruction

A classic approach to find the solution of Equation 7 above is to solve the following constrained optimization problem.

$$\min_x \Psi(x) \quad \text{[Equation 9]}$$

subject to $y = A_\Omega x$

Here, $\Psi(x)$ is, for example, a sparsity promoting regularizer derived from compressed sensing (CS) theory, such as $l_1$ wavelet and total variation (TV). Solving Equation 9 above typically involves proximal algorithms such as variable splitting or projection onto the convex sets (POCS), which decouples the optimization of the prior term and the forward consistency term. Then, embodiments of the present disclosure may alternate between solving the two sub-problems to arrive at the optimum.

In Bayesian perspective, embodiments of the present disclosure may immediately see that $\Psi(x)$ in Equation 9 above is the prior model of the data, that is, $p_{(x)}$. Hence, embodiments of the present disclosure may imagine that by more accurately estimating the complex prior data distribution, it would be able to achieve higher quality samples.

That being said, one of the important differences of the proposed method compared to the classical approaches is that rather than modeling the prior distribution $p_{(x)}$, embodiments of the present disclosure exploit its stochastic samples. Specifically, the samples from the prior distribution may be obtained from the reverse SDE in Equation 4 above, which may be discretized as illustrated in Algorithm 1.

$$x_{(i)} = (\sigma_{i+1}^2 - \sigma_i^2) s_\theta(x_{i+1}, \sigma_{i+1}) + \sqrt{\sigma_{i+1}^2 - \sigma_i^2} z \quad \text{[Equation 10]}$$

Then, the projection on the constraint in Equation 9 above may be implemented as follows.

$$x_i = A_\Omega^c {}^* A_\Omega^c x_i + A_\Omega y^* \quad \text{[Equation 11]}$$

This effectively assigns the data consistency by replacing the current estimate in $\Omega$ with a known value of y. This is referred to as the data consistency projection step. Application of Equations 10 and 11 above corresponds to the predictor step.

When using the additional corrector steps as in Algorithm 1, embodiments of the present disclosure may also apply the same treatment to the discrete corrector step, which may be represented as follows.

$$x_i = x_{i+1} + \epsilon_i s_\theta(x_{i+1}, \sigma_{i+1}) + \sqrt{2\epsilon_i} z \quad \text{[Equation 12]}$$

Here, $\epsilon_i$ is the step size at the $i^{th}$ iteration. Iteratively applying a predictor step and a corrector step as in PC algorithm gives rise to the inference algorithm for score-POCS, which is described formally in Algorithm 2. Table 2 below represents Algorithm 2.

TABLE 2

Algorithm 2 Score-POCS sampling (Real)

Require: $s_\theta$, N, M, $\{\epsilon_i\}$  Step size, $\{\sigma_i\}$  noise schedule
Define $A_\Omega := \mathcal{P}_\Omega \mathcal{F} S$
1: $x_N \sim N(0, \sigma_T^2 I)$
2: for i = N − 1: 0do
3:     $x_i \leftarrow \text{Predictor}(x_{i+1}, \sigma_i, \sigma_{i+1})$
4:     $x_i \leftarrow \text{Re}(A^*_{\Omega^c} A_{\Omega^c} x_i + A^*_\Omega y)$
5:     for j = 1: M do
6:        $x_i \leftarrow \text{Corrector}(x_i, \sigma_i, \epsilon_i)$
7:        $x_i \leftarrow \text{Re}(A^*_{\Omega^c} A_{\Omega^c} x_i + A^*_\Omega y)$
8:     end for
9: end for
10: return $x_0$ Unfortunately, this algorithm may only be used when embodiments of the present disclosure know a priori that the signal only contains real values, and care must be taken since in most practical situations of MRI reconstruction, the signal that embodiments of the present disclosure would like to reconstruct is complex. This introduces a caveat when reconstructing the data with the score function because the original theory of score-based SDEs was not developed to handle complex signals.

One approach that is feasible is to train a score function so that it handles complex signals. Implementation-wise, this corresponds to considering a real part and an imaginary part of the signal as separate channels and applying the denoising score matching objective to handle 2×H×W sized image. However, embodiments of the present disclosure empirically found that this treatment reduces the stability of network training, and also hurts the performance of the reconstruction using Algorithm 2. Embodiments of the present disclosure further note that this treatment limits the practicality since the model now requires raw k-space data for training.

To overcome these limitations, embodiments of the present disclosure propose a simple fix to Algorithm 2, which provides a method to use the score function $s_\theta$ trained with magnitude images only, and use it to reconstruct complex images.

The method is presented in Algorithm 3, which may be represented as in Table 3 below.

TABLE 3

Algorithm 3 Score-POCS sampling (SENSE-type)

Require: $s_\theta$, N, M, $\{\epsilon_i\}$ Step size, $\{\sigma_i\}$ noise schedule
1: if parallel imaging (PI) then
2:     $A_\Omega := P_\Omega FS$
3: else
4:     $A_\Omega := P_\Omega F$
5: end if
6: $x_N \sim N(0, \sigma_T^2 I)$
7: for i = N − 1: 0 do
8:     $Re(x_i) \leftarrow \text{Predictor}(Re(x_{i+1}), \sigma_i, \sigma_{i+1})$
9:     $Im(x_i) \leftarrow \text{Predictor}(Im(x_{i+1}), \sigma_i, \sigma_{i+1})$
10:     $x_i = Re(x_i) + \iota Im(x_i)$
11:     $x_i \leftarrow A^*_\Omega c A_\Omega c x_i + A^*_\Omega y$
12:     for j = 1: M do
13:        $Re(x_i) \leftarrow \text{Corrector}(Re(x_i), \sigma_i, \epsilon_i)$
14:        $Im(x_i) \leftarrow \text{Corrector}(Im(x_i), \sigma_i, \epsilon_i)$
15:        $x_i = Re(x_i) + \iota Im(x_i)$
16:        $x_i \leftarrow A^*_\Omega c A_\Omega c x_i + A^*_\Omega y$
17:     end for
18: end for
19: return $x_0$ Here, embodiments of the present disclosure split the image into a real part and an imaginary part, and apply the predictor-corrector step separately to each part. Accordingly, embodiments of the present disclosure may use the same score function that was trained with DICOM images to deal with complex image data in a seamless way. This simple fix works surprisingly well, and reconstruction of complex-valued coil data with Algorithm 3 even outperforms the standard feed-forward neural network trained with explicit supervision. Thus, being able to utilize score functions trained with DICOM-only data to reconstruct complex-valued data is a great advantage since embodiments of the present disclosure may use only the DICOM data to train the neural network. This is advantageous because the plethora of MR scans exist in the form of DICOM, while the raw k-space data are usually discarded due to their excessive memory size.

Diffusion Model Meeting Parallel Imaging (PI)

While the proposed score-POCS framework for the reconstruction of complex-valued data is extremely useful, most modern MRI scanners have multiple receiver coils, which capture the signal with different sensitivities. Since the form of PI, myriad of techniques to reconstruct the true latent signal have been proposed, two of the most prominent being SENSE and GRAPPA. Here, embodiments of the present disclosure show that the score-POCS may be integrated seamlessly into GRAPPA.

Figure 2:
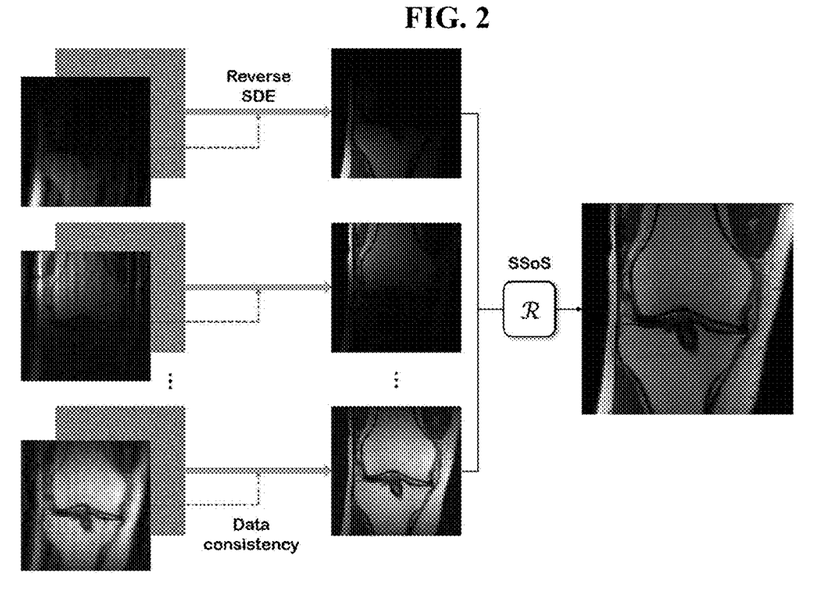
FIG. 2 is a drawing illustrating a score-POCS applied to parallel imaging according to an embodiment of the present disclosure.

FIG. 2 is a drawing illustrating a score-POCS applied to parallel imaging according to an embodiment of the present disclosure. Referring to FIG. 2, coil images are reconstructed separately, then merged with the SSOS operation.

Specifically, as introduced in Algorithm 4, an objective of the present disclosure is to reconstruct the data coil-by-coil. However, unlike GRAPPA, instead of estimating of the GRAPPA kernels, embodiments of the present disclosure simply apply Algorithm 3 separately to each coil image, as illustrated in FIG. 2. Notably, although a score function estimator $s_\theta(x, t) \cong \nabla_x \log p(x)$ according to embodiments were not trained with separate coil images, since the distribution of independent coil images does not deviate much from p(x). Simply applying Algorithm 3 to each coil image induces a very accurate reconstruction. Once this is done, embodiments of the present disclosure arrive at the final result with SSOS operation.

One caveat for the GRAPPA-type approaches is the slow inference speed. Simply implementing the GRAPPA-type score-POCS will induce c times longer computation time compared to the single-coil reconstruction. However, this may be much relieved by performing parallel computation with each coil data, since no computation needs to be shared across the threads. Given sufficient GPU resources, embodiments of the present disclosure expect that the computation time needed for reconstruction using the GRAPPA-type approaches will be reduced down to the time needed for single-coil reconstruction.

Figure 3:
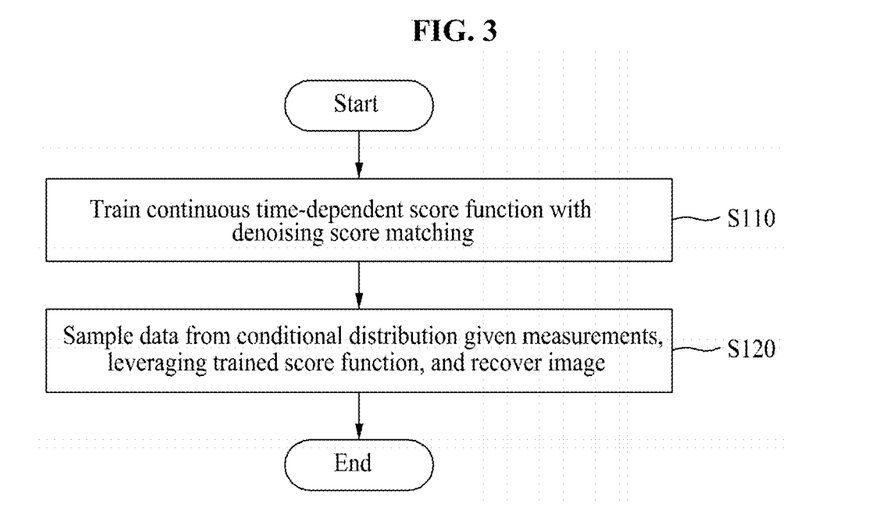
FIG. 3 is a flowchart illustrating an MRI recovery method using a score-based diffusion model according to an embodiment of the present disclosure.

FIG. 3 is a flowchart illustrating an MRI recovery method using a score-based diffusion model according to an embodiment of the present disclosure.

Referring to FIG. 3, the MRI recovery method using the score-based diffusion model, which is performed by a computer device, according to an embodiment of the present disclosure may be implemented, including training (S110) a continuous time-dependent score function with denoising score matching and sampling (S120) data from a conditional distribution given the measurements, leveraging the learned score function, and recovering an image.

Figure 4:
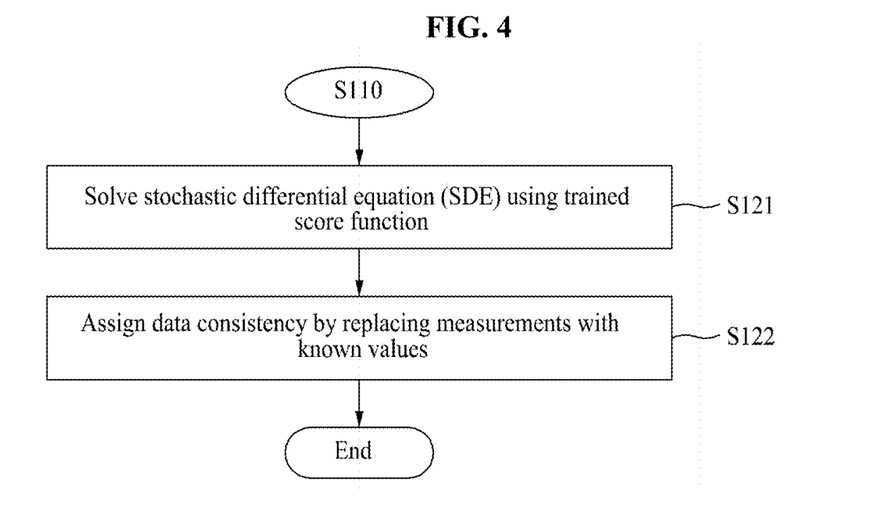
FIG. 4 is a flowchart illustrating a method for sampling data and recovering an image according to an embodiment of the present disclosure.

FIG. 4 is a flowchart illustrating a method for sampling data and recovering an image according to an embodiment of the present disclosure.

Referring to FIG. 4, the recovering (S120) of the image may include solving (S121) a stochastic differential equation (SDE) using the trained score function and assigning (S122) data consistency by replacing the measurements with known values and may iteratively perform operation S121 and operation S122.

A description will be given in detail below of the MRI recovery method using the score-based diffusion model, which is performed by a computer device, according to an embodiment of the present disclosure with reference to FIGS. 3 and 4.

An MRI recovery apparatus using a score-based diffusion model according to an embodiment of the present disclosure may be described as an example in the MRI recovery method using the score-based diffusion model according to an embodiment of the present disclosure.

Figure 5:
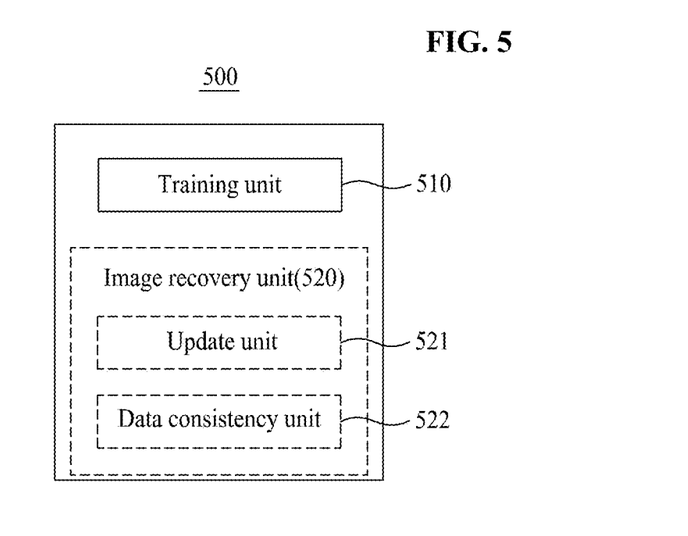
FIG. 5 is a block diagram illustrating an MRI recovery apparatus using a score-based diffusion model according to an embodiment of the present disclosure.

FIG. 5 is a block diagram illustrating an MRI recovery apparatus using a score-based diffusion model according to an embodiment of the present disclosure.

Referring to FIG. 5, an MRI recovery apparatus 500 using a score-based diffusion model according to an embodiment of the present disclosure may be implemented, including a training unit 510 and an image recovery unit 520. According an embodiment, the image recovery unit 520 may include an update unit 521 and a data consistency unit 522.

In operation S110, the training unit 510 may train a continuous time-dependent score function with denoising score matching. In detail, the training unit 510 may train a score function of training the distribution of MRI with continuous-time score matching using the score-based diffusion model.

For example, the training unit 510 may train a network using denoising score matching loss for the variance preserving-SDE (VP-SDE).

For another example, the training unit 510 may train the network using denoising score matching loss for the variance exploding-SDE (VE-SDE).

In operation S120, the image recovery unit 520 may sample data from a conditional distribution given the measurements, leveraging the trained score function, and may recover an image.

In operation S121, the update unit 521 may solve an SDE using the trained score function. In operation S122, the data consistency unit 522 may assign data consistency based on the projection by replacing the measurements with known values. In this case, operation S121 and operation S122 may be iteratively performed.

Herein, the update unit 521 may split the image into a real part and an imaginary part and may iteratively apply a predictor step and a corrector step to each of the real part and the imaginary part.

Furthermore, the image recovery unit 520 may reconstruct complex-valued data using the score function trained with DICOM images only.

In addition, the image recovery unit 520 may recover, reconstruct, and merge respective coil image using parallel imaging (PI).

Embodiments of the present disclosure may provide a deep learning-based image recovery method capable of training a neural network with DICOM images only, being applied to complex images and PI, and having high performance.

First of all, embodiments of the present disclosure may train a score function of training the distribution of MRI with continuous-time score matching. When recovering the image using it, embodiments of the present disclosure may use it for image reconstruction by sequentially applying the operation of solving a stochastic differential equation (SDE) and the operation of assigning the data consistency to the measurements. Embodiments of the present disclosure may generate one image by independently applying image recovery to a real part and an imaginary part for complex images. PI may derive the result by recovering respective coil images.

Thus, embodiments of the present disclosure are expected to be established as a single solution that may solve all the problems of MRI with a single score function.

Hereinafter, a description will be given of the experimental method and implementation according to an embodiment of the present disclosure.

All the experiments were performed with fastMRI knee dataset, which is publicly available. Embodiments of the present disclosure trained the network with 320×320 size target image magnitude, given as the key reconstruction_esc. Embodiments of the present disclosure note that it is possible to train the score function with the same target from reconstruction_rss of the multi-coil dataset, but embodiments of the present disclosure found no significant difference in the performance.

Among 973 volumes of training data, embodiments of the present disclosure dropped the first and last five slices from each volume, to avoid training the model with noise-only data. This results in approximately 25 k slices of training data. For testing, embodiments of the present disclosure randomly sampled 30 volumes from the validation set, and dropped the first and last 5 slices from each volume.

Embodiments of the present disclosure follow the following procedures to train VE-SDE. Specifically, embodiments of the present disclosure train the network with the objective given in Equation 5 above, with setting $\lambda(t)=\sigma^2(t)$. Note that this specific choice of $\lambda(t)$ stabilizes the noise scale across t, and theoretically corresponds to likelihood weighting. Plugging in the weighting function, embodiments of the present disclosure may train the model with the following cost.

$$\min_\theta \mathbb{E}_{t \sim U(\epsilon,t)} \mathbb{E}_{x(0) \sim p_0} \qquad \text{[Equation 13]}$$

$$\mathbb{E}_{x(t) \sim \mathcal{N}(x(0),\sigma^2(t)I)} \left[ \left\| \sigma(t) s_\theta(x(t), t) - \frac{x(t) - x(0)}{\sigma(t)} \right\|_2^2 \right]$$

Setting $\epsilon = 10^{-5}$ is given to circumvent numerical issues.

For the step size used in the Langevin MC corrector step, embodiments of the present disclosure follow what is advised and sets Equation 14 below.

$$\epsilon_i = 2r \frac{\|z\|_2}{\|s_\theta(x_i, \sigma_i)\|_2} \qquad \text{[Equation 14]}$$

Here, r=0.16 is set to a constant value. For noise variance schedule, embodiments of the present disclosure fix $\sigma_{min}=0.01$, $\sigma_{max}=378$, then take the geometric series with the following form.

$$\sigma(t) = \sigma_{min} \left( \frac{\sigma_{max}}{\sigma_{min}} \right)^t. \qquad \text{[Equation 15]}$$

Embodiments of the present disclosure take the batch size of 1, and optimize the network using the Adam optimizer ($\beta_1=0.9$, $\beta_2=0.999$). Embodiments of the present disclosure use a linear warm-up schedule for the parameters for the first 5000 steps of optimization, reaching 2e-4 at the $5000^{th}$ step. Embodiments of the present disclosure apply gradient clipping with the maximum value of 1.0. Exponential moving average with rate 0.999 is applied to the parameters. Optimization was performed for 100 epochs, and it took about 3 weeks of training the score function with a single RTX 3090 GPU. All code was implemented in PyTorch.

For all algorithms, embodiments of the present disclosure use N=2000, M=1 iterations for inference as default, unless specified otherwise. Single forward-pass through $s_\theta$ required for both predictor and corrector steps, which takes about 150 ms with a commodity GPU. Summing up, this results in about 10 minutes of reconstruction time for real-valued images, and 20 minutes of reconstruction time for complex-valued images.

Embodiments of the present disclosure base the implementation of the time-dependent score function model nesnpp as suggested in (non-patent document 1). The model architecture stems from U-Net, and the sub-blocks which consist U-Net are adopted from residual blocks of BigGAN. The skip connections in the residual blocks are scaled by $1/\sqrt{2}$. For pooling and unpooling, embodiments of the present disclosure adopt the following anti-aliasing pooling. The resulting U-Net has 4 different levels of scale, with 4 residual networks at each level. Conditioning of network with the time index t is performed with Fourier features, where the conditional features are added to the encoder features.

To verify superiority over the current standards, embodiments of the present disclosure perform comparison studies with baseline methods used in (non-patent document 2). Embodiments of the present disclosure choose total variation (TV) reconstruction as the representative CS reconstruction method, where embodiments of the present disclosure use the implementation in sigpy.mri.app.TotalVariationRecon. Embodiments of the present disclosure perform grid search on the hyper-parameter lambda, and report only the best results among them.

For a representative deep learning approach, embodiments of the present disclosure use supervised learning-based reconstruction using U-Net. While embodiments of the present disclosure could use the open-sourced pre-trained model, they reimplemented the model to achieve better performance.

To quantify the proximity of the reconstructions to the target, embodiments of the present disclosure use the two standard metrics, that is, peak signal-to-noise ratio (PSNR) and structural similarity index (SSIM). While these are the two most widely used metrics in the community, it is also well known that these metrics hardly line up with the radiologists' scoring on the image quality.

To fully capture the superiority of the proposed method, embodiments of the present disclosure focus on the fact that good reconstructions are the ones that may be used for accurate diagnosis. If the reconstruction quality closely matches the ground truth, there should be no degeneration in the performance of the downstream tasks in the diagnosis according to embodiments. In order to compare against ground truth, the diagnostic ability of each reconstruction, embodiments of the present disclosure leverage the recent fastMRI+ dataset. For fastMRI knee data, fastMRI+ annotations provide bounding boxes around the pathologic region. Embodiments of the present disclosure train a standard object detection model using the ground truth (fully sampled) images and use this network to compare how well the model performs on pathology detection with reconstructions using different methods. From the experiments, embodiments of the present disclosure quantify three standard metrics from the object detection, which mean average precision (mAP), precision, and recall.

For the object detection model, embodiments of the present disclosure may use the state-of-the-art YOLO v5. Embodiments of the present disclosure use the default configuration of YOLOv5m, which is a medium-sized model, often suggested as the baseline model when the amount of data is not sufficient. When trying to fit larger versions of the model, namely YOLOv5l, YOLOv5x, etc., embodiments of the present disclosure found that overfitting occurs and the performance drops by a small margin.

For training data of the YOLOv5 model, embodiments of the present disclosure use all the training data with annotations in fastMRI+, which consists of 8053 images in total. Embodiments of the present disclosure do not include any images without annotations in the training set. For testing, embodiments of the present disclosure select 4 random cases that consist of 45 images in total in the validation set.

Model weights were fine-tuned from the open-source pre-trained model, and were trained for 300 epochs using the batch size of 16. Training took about a day on 2×2080Ti GPU. As described above, it was shown that embodiments of the present disclosure may go beyond the score function capable of removing noise and may apply it to MRI recovery. Furthermore, it was revealed that image recovery may be performed with excellent performance even without training the neural network such that MRI recovery may be performed through supervised learning.

Embodiments of the present disclosure proposes present a new way capable of performing image recovery with higher accuracy through multiple steps using a diffusion model and training a model without any raw k-space data.

The foregoing devices may be realized by hardware elements, software elements and/or combinations thereof. For example, the described systems, devices components illustrated in the exemplary embodiments of the inventive concept may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may perform an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be embodied in any type of machine, components, physical equipment, virtual equipment, or computer storage media or devices so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described exemplary embodiments of the inventive concept may be implemented with program instructions which may be executed through various computer means and may be recorded in computer-readable media. The computer-readable media may also include, alone or in combination with the program instructions, data files, data structures, and the like. The program instructions recorded in the media may be designed and configured specially for the exemplary embodiments of the inventive concept or be known and available to those skilled in computer software. Examples of computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter.

According to embodiments of the present disclosure, the MRI recovery method using the score-based diffusion model and the apparatus thereof may be provided to sample data from a conditional distribution given the measurements, leveraging the trained score function, thus solving inverse problems in imaging.

While a few embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

What is claimed is:

1. A magnetic resonance imaging (MRI) recovery method using a score-based diffusion model, the MRI recovery method being performed by a computer device and comprising:
    training a continuous time-dependent score function with denoising score matching; and
    sampling data from a conditional distribution given measurements, leveraging the trained score function, and recovering an image,
    wherein the recovering of the image includes:
    solving an SDE using the trained score function; and
    assigning data consistency by replacing the measurements with known values,
    wherein the solving of the SDE and the assigning of the data consistency are iteratively performed,
    wherein the solving of the SDE includes:
    splitting the image into a real part and an imaginary part and iteratively applying a predictor step and a corrector step to each of the real part and the imaginary part.

2. The MRI recovery method of claim 1, wherein the training of the score function includes:
    training the score function of training the distribution of MRI with continuous-time score matching using the score-based diffusion model.

3. The MRI recovery method of claim 1, wherein the training of the score function includes:
    training a network using denoising score matching loss for a variance preserving-stochastic differential equation (VP-SDE).

4. The MRI recovery method of claim 1, wherein the training of the score function includes:
    training a network using denoising score matching loss for a variance exploding-SDE (VE-SDE).

5. The MRI recovery method of claim 1, wherein the recovering of the image includes:
    reconstructing complex-valued data using the score function trained with DICOM images only.

6. The MRI recovery method of claim 1, if the image is a parallel image, wherein the recovering of the image includes:
    recovering, reconstructing, and merging respective coil images included in the parallel image.

7. A magnetic resonance imaging (MRI) recovery apparatus using a score-based diffusion model, the MRI recovery apparatus comprising:
    a training unit configured to train a continuous time-dependent score function with denoising score matching; and
    an image recovery unit configured to sample data from conditional distribution given measurements, leveraging the trained score function, and recover an image,
    wherein the image recovery unit includes:
    an update unit configured to solve an SDE using the trained score function; and
    a data consistency unit configured to assign data consistency by replacing the measurements with known values,
    wherein the solving of the SDE in the update unit and the assigning of the data consistency in the data consistency unit are iteratively performed,
    wherein the update unit splits the image into a real part and an imaginary part and iteratively applies a predictor step and a corrector step to each of the real part and the imaginary part.

8. The MRI recovery apparatus of claim 7, wherein the training unit trains a network using denoising score matching loss for a variance preserving-stochastic differential equation (VP-SDE).

9. The MRI recovery apparatus of claim 7, wherein the training unit trains a network using denoising score matching loss for a variance exploding-SDE (VE-SDE).

10. The MRI recovery apparatus of claim 7, wherein the image recovery unit reconstructs complex-valued data using the score function trained with DICOM images only.

11. The MRI recovery apparatus of claim 7, if the image is a parallel image, wherein the image recovery unit recovers, reconstructs, and merges respective coil images included in the parallel image.

* * * * *